United States Patent [19]
Manucy, III

[11] Patent Number: 5,399,845
[45] Date of Patent: Mar. 21, 1995

[54] OPTICAL DATA DETECTING APPARATUS AND METHOD

[76] Inventor: Leslie G. Manucy, III, 8620 Rockland Dr., Jacksonville, Fla. 32221-1617

[21] Appl. No.: 83,341

[22] Filed: Jun. 28, 1993

[51] Int. Cl.⁶ ........................... G06K 7/10; G06K 7/14
[52] U.S. Cl. ...................................... 235/454; 434/358
[58] Field of Search ..................... 235/454, 456, 483; 434/358, 360

[56] References Cited

U.S. PATENT DOCUMENTS

| | | | |
|---|---|---|---|
| 3,800,439 | 4/1974 | Sokolski et al. | 434/358 |
| 3,939,327 | 2/1976 | Humphrey | 235/454 |
| 3,983,364 | 9/1976 | Firehammer et al. | 235/454 |
| 4,283,622 | 8/1981 | Passer et al. | 235/487 |
| 5,046,005 | 9/1991 | Vilardebo et al. | 434/358 |

*Primary Examiner*—Davis L. Willis
*Assistant Examiner*—Peter J. Rashid
*Attorney, Agent, or Firm*—Arthur G. Yeager

[57] ABSTRACT

An apparatus for optically detecting data on paper or reusable plastic sheets, delivering the data directly to a computer including reflective photoelectric sensors to detect marks on the sheets. The software employed may use a multitude of methods to extract information from the data. The parallel I/O interface card between the apparatus and a computer permits data sampling of many sensors simultaneously. Many different thicknesses and reflectiveness of sheets may be used, thus permitting use of inexpensive photo copied forms. The apparatus is simplified by taking advantage of circuitry and the power source in the computer. The apparatus may be used to grade papers, tabulate votes, collect survey information, match people best suited for a job, date matching, or any other purpose in which data from marks on sheets can be used by a general or special purpose computer.

20 Claims, 6 Drawing Sheets

OPTICAL DATA DETECTING APPARATUS AND METHOD

FIELD OF THE INVENTION

The present invention relates to optical detecting apparatus of data or marks on sheets, and particularly to such detecting apparatus used in delivery of such data to a computer for storage and the like.

BACKGROUND OF THE INVENTION

There have been many prior art machines used to score or grade test answer sheets. Illustrative of one such machine is U.S. Pat. No. 3,800,439 in which the test sheets are fed into the machine which reads the sheets and performs a number of different storage, scoring, and printing functions resulting in a machine that is quite expensive to purchase, for example. Another problem is that a start of test control mark with the motor running constantly is employed in such machine. As far as known, other readers of test sheets employ batch processing which limits their flexibility.

In particular, teachers need inexpensive reliable detector apparatus to deliver the data or marks from a test sheet directly into a personal computer in the classroom which has a grade book software installed therein. Also, the prior art machines are incapable of grading customized tests directed to various students in the same class. The prior art machines are large and not designed for individual use by teachers in their classrooms.

An object of this invention is to provide an improved optical data detecting apparatus and method. Additional objects are to overcome the aforementioned problems of the prior art. Another object is to provide such apparatus which integrates with existing computers in the classrooms. A further object is the provision of such an apparatus which can be used to scan printed paper sheets and/or photocopied paper sheets and/or reusable plastic sheets.

SUMMARY OF THE INVENTION

In one aspect of the present invention there is provided an apparatus for detecting data on a sheet having a row of index marks aligned with each other along a sheet and a plurality of spaced rows of answer spaces located perpendicularly to the row of index marks for data to be entered with each of the index marks. The apparatus includes a housing having an inclined elongated sheet chute with a ledge extending therealong, a plurality of spaced optical detectors mounted to the housing and positioned with one or the detectors being an index detector in alignment with all of the row of index marks and the other detectors being in alignment with respective rows of the answer spaces. Electric circuit means, including electric motor means, is mounted to the housing for driving the sheet from an entrance upstream of the detectors, past the detectors and out an exit downstream of the detectors. Pressure means are supported by the sheet chute at the location of the detectors for uniformly pressing the sheet toward the detectors. Spacer means are located between adjacent pairs of detectors and mounted on the detectors facing the pressure means, and the spacer means are removed from the critical paths of the detectors for maintaining the sheet a predetermined distance away from the detectors as determined by the focal length of the optical path of the detectors.

Other aspect is of the invention are provided by the electric motor means including a motor, a driving shaft connected to the motor, a driven shaft spaced from the driving shaft, an endless elongated belt connected about the shafts, the belt having a sheet engaging span extending generally in alignment with the spacer means, and another pressure means supported by the sheet chute spacedly from the detectors for pressing the sheet against the sheet engaging span of the belt to enable the belt to frictional engage the sheet and move same between the entrance and out the exit. Also included is a means for automatically disabling the electric motor means between successive sheet feeds. The means for automatically disabling includes a background simulating solid index marks for detection by the index detector after a predetermined time interval in which only the solid index marks are detected.

Further aspects include the provision of another detector located at the entrance to detect initial insertion of the sheet by detecting an edge of the sheet which activates the electric circuit means to enable the electric motor means. The sheet is reuseable plastic or paper.

Additional aspects are that the electric circuit means includes interface means for electrically connecting the apparatus to a computer for driving the electric motor means. The detectors are connected via the interface means in parallel so that all of the detectors may pass signals to a computer simultaneously. The interface means includes means for disabling power from a computer in the event of an overload in the electrical circuit means of the apparatus and other electrical faults between the apparatus and a computer. An initial sheet sensing detector is located at the entrance for sensing the presence of a sheet and for providing a signal through the interface means to cause a computer to enable the electric motor means to drive the sheet through the apparatus. A background member simulating solid index marks is disposed opposite to the initial sheet sensing detector with a sheet being insertable therebetween which is sensed by the initial sheet sensing detector.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE PREFERRED EMBODIMENT

Figure 1:
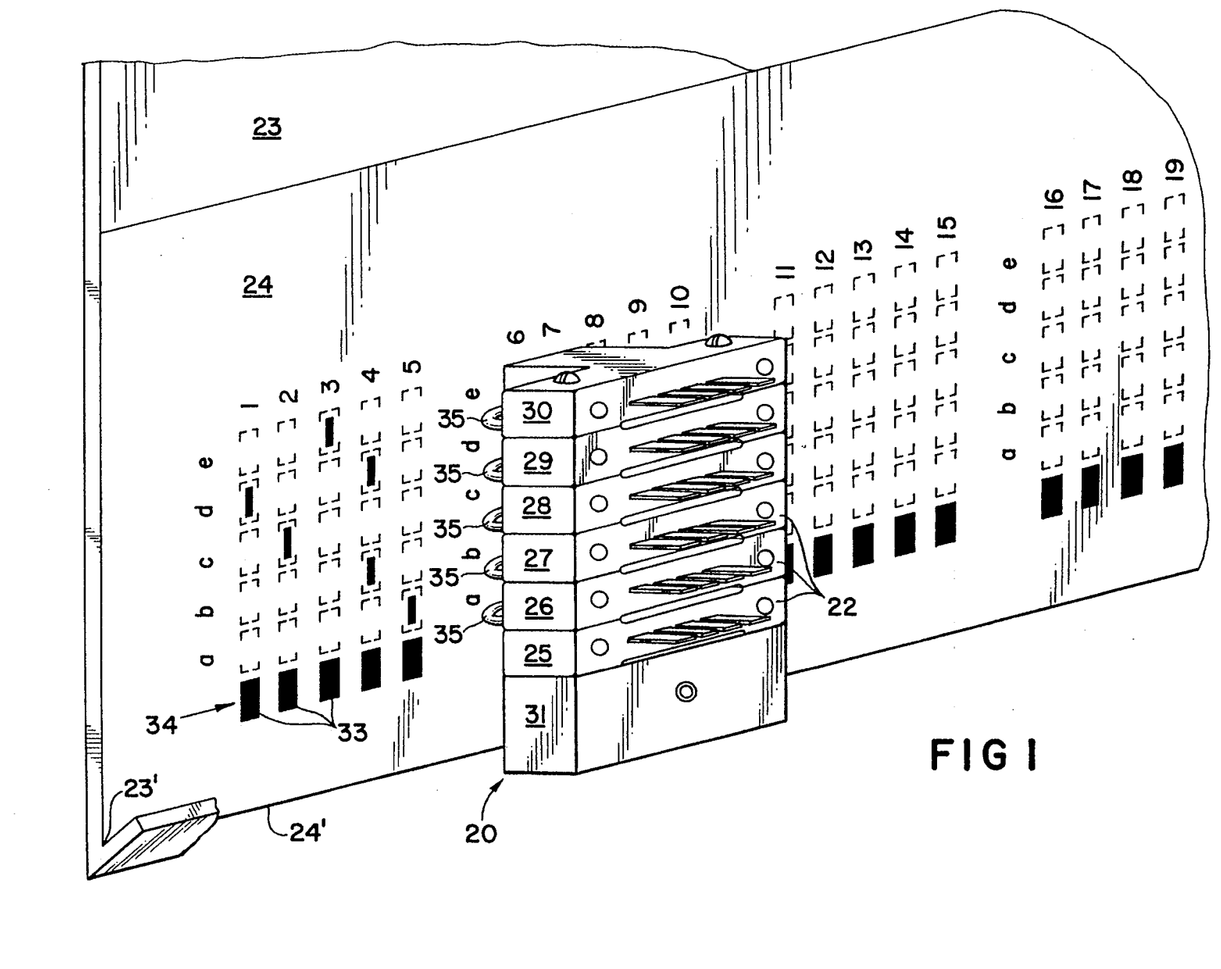
FIG. 1 is a perspective view of detecting part of the optical apparatus in accord with this invention and a test scoring sheet in a horizontal format.
Figure 2:
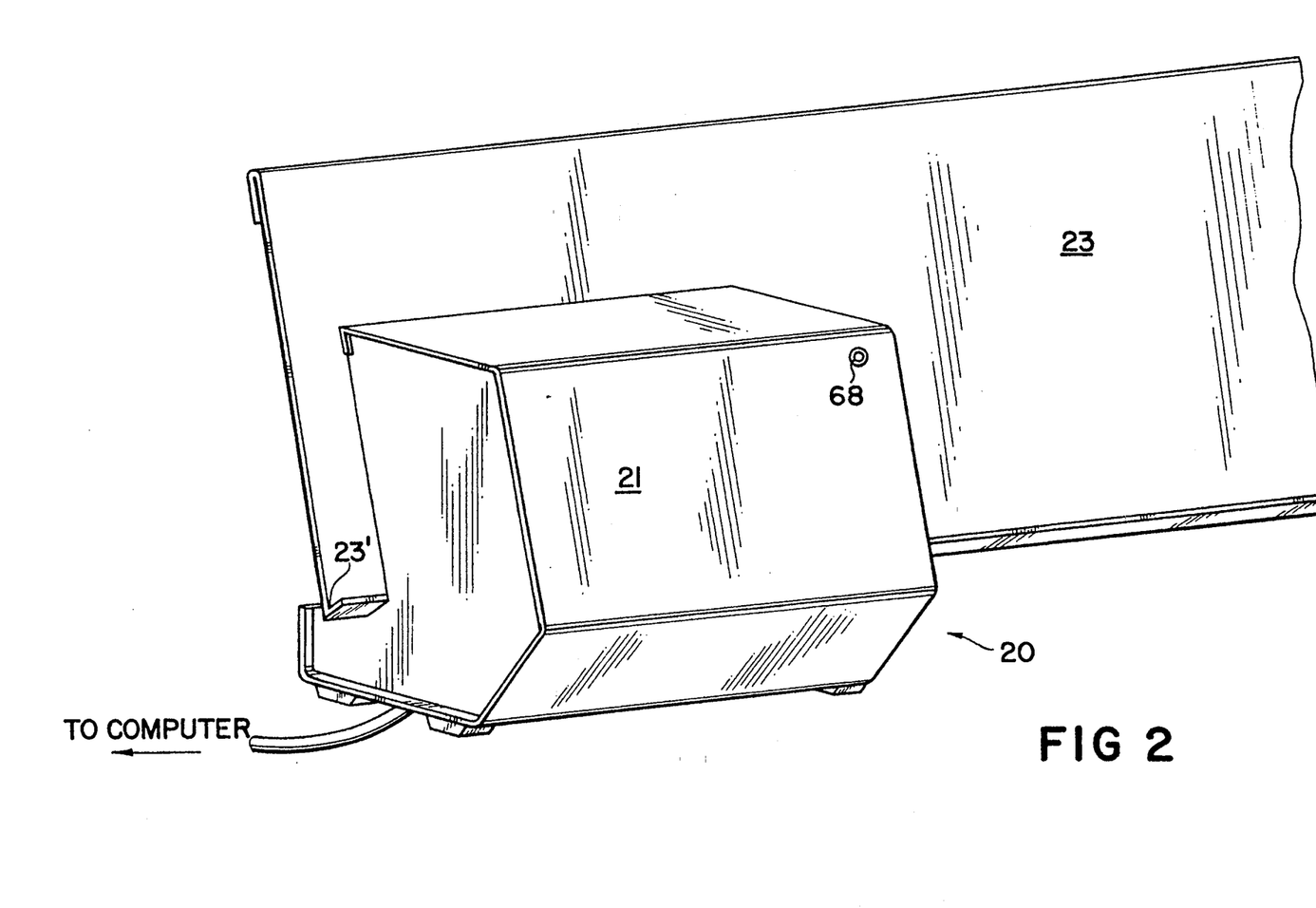
FIG. 2 is a front perspective view of the housing part of the optical apparatus in which the detecting part of FIG. 1 is mounted.
Figure 6:
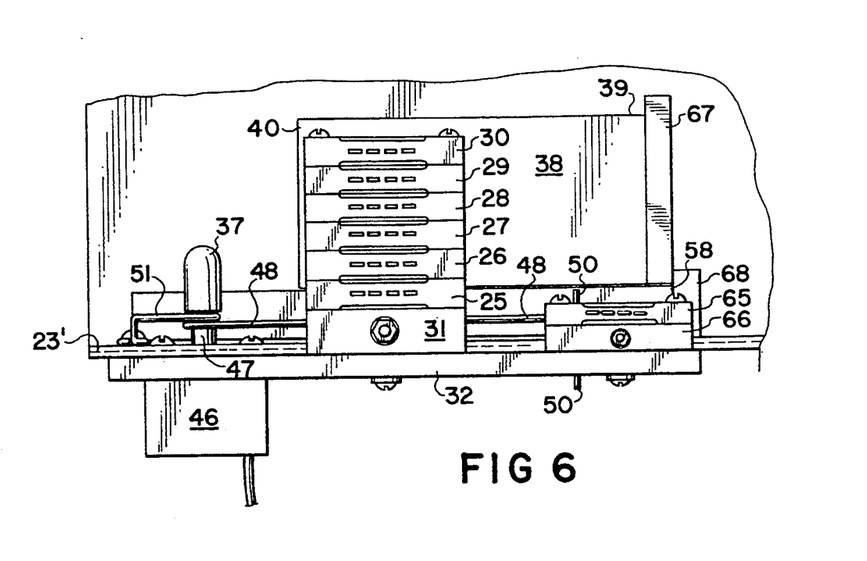
FIG. 6 is a front elevational view of the apparatus of FIGS. 1-5 with housing removed for clarity of illustrations.

Referring to the drawings of FIGS. 1 and 2, the optical detecting apparatus is identified by numeral 20 which includes a housing 21 in which the main detecting means 22 is mounted and a sheet guide or chute 23 supports sheet 24 as it is fed past detecting means 22. Main detecting means 22 includes a plurality, herein shown as six, detectors 25-30 and may be of reflective type of photomicrosensors sold for example, by Omron, Model EE-SB5V. The detectors 25-30 are mounted on a mounting block 31 which is attached to base plate 32, as shown in FIG. 6, which is part of housing 21. Detector 25 senses the indexing preprinted marks 33 in the lower horizontal row 34 as each of the vertical columns 1-19, etc. are fed past the detectors 25-30. For example, in columns 1-5 the respective horizontal row data markings are d, c, e, b and d, and a which would have been sensed as the sheet 24 passes through the detecting means 22 by respective detectors 29, 28, 30, 27 and 29, and 26, in much the same way as is used in the prior art.

With reference to FIGS. 1-5, a plurality of sheet engaging members or spacers 35 are attached to the detectors 25-30 and located horizontally to engage the sheet 24 at three or more locations between adjacent horizontal rows 34 and a; b and c; and d and e so as not to interfere with the proper sensing by detectors 25-30. Also, if grease pencil were used on a plastic sheet 24 smearing would be diminished as the plastic sheet were graded or scored by the apparatus of this invention. Mounted to the sheet chute 23 in the area opposite to sheet 24 engaging members or spacers 35 is a slightly compressed foam pad 36 between a cover member 37, which may be white cardboard, and the sheet chute 23. An elongated member 38 has an end portion 39 attached upstream from detecting means 22 and a free end portion 40 extends between spacers 35 and cover 37 and terminates slightly downstream of the sensing area of detecting means 22. This arrangement assures that the surface of sheet 24 containing the data is at the proper focal length from the detecting means 22 regardless of the thickness of the sheet 24 be it paper or a thicker reusable plastic.

Figure 3:
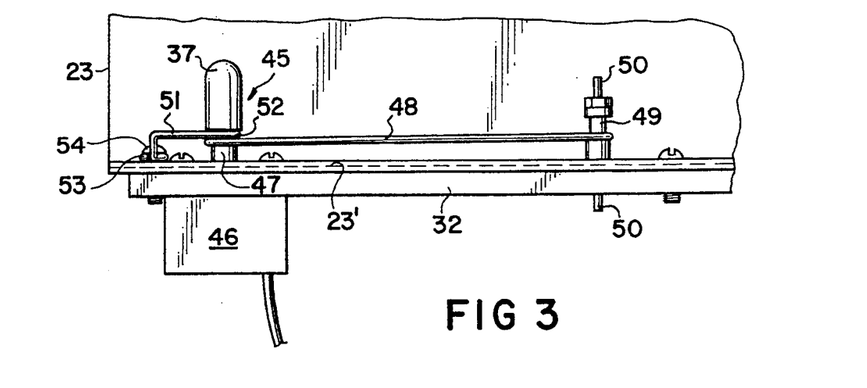
FIG. 3 is a front elevational view of the drive mechanism mounted in the housing of FIG. 2.
Figure 4:
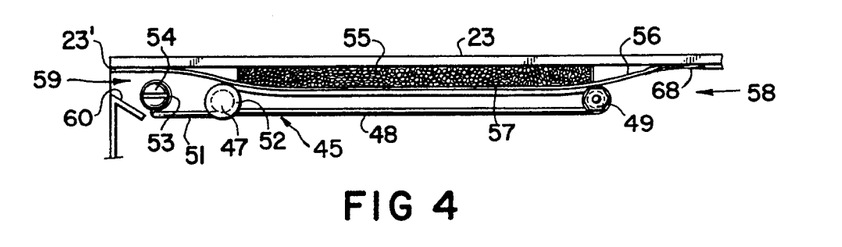
FIG. 4 is a top elevational view of the drive mechanism of FIG. 3.
Figure 5:
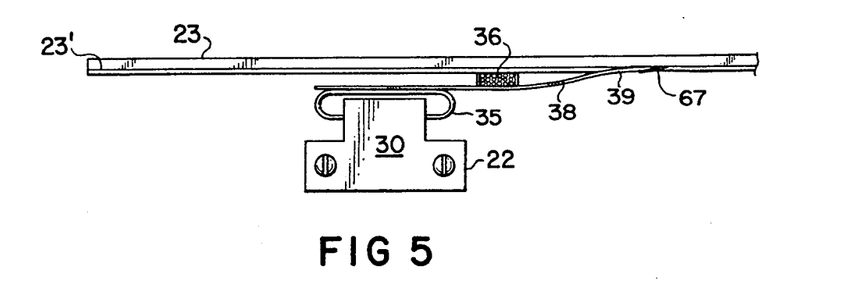
FIG. 5 is a top elevational view of the sheet pusher which presses the sheet into proper position for the detecting part of the optical apparatus of FIG. 1.

The drive mechanism 45 for the sheet 24 is shown in FIGS. 3 and 4 and includes an electric motor 46 mounted below base plate 32 driving a shaft 47 which in turn drives a horizontally elongated belt 48 mounted for rotation about the shaft 47 and idler bushing 49 on stationary shaft 50. A hold down arm 51 is positioned with a free end portion 52 about the shaft 47, but not engaged with the shaft 47, so that the belt 48 is slightly slanted downwardly from its position on idler bushing 49 to its position on shaft 47 as determined by hold down arm 51. The other end 53 is affixed by bolt 54 to base plate 32. An elongated slightly compressed foam 55 is attached to sheet chute 23 substantially between the shafts 47 and 50 as shown in FIG. 4. A cover 56 is attached to sheet chute 23 upstream from idler bushing 49 and downstream from shaft 47, i.e., generally the width of housing 21. Cover 56 is pressed slightly toward the adjacent portion 57 of belt 48 so that the sheet 24 will be sandwiched therebetween and fed from its entrance at 58 past the detecting means 22 and out of the exit 59. A sheet deflector 60 within housing 21 is appropriately positioned to make certain that the ejected sheet 24 at the exit 59 is propelled outwardly of housing 21 when sheet 24 is released by belt 48 at shaft 47. A suitable material for cover 56 is, for example, black construction paper, it being understood that a non-reflective black fabric or black plastic may be employed since cover 56 extends above the lowermost sensor 25 of detecting means 22, as shown in FIG. 6, as well as being opposite to the initial sheet detector 65 attached to a mounting block 66 affixed to base plate 32 at the entrance 58, hereinafter more fully described.

With the apparatus properly coupled to a computer by conductors (not shown) the LED 68 (see FIG. 2) when glowing indicates that the apparatus 20 is ready for use by inserting a sheet 24 into the entrance 58 with the lower edge 24' engaged with the lower angled ledge 23' of sheet chute 23. To assure the proper entrance of the sheet from being stopped by the thick edge of end portion 39 of member 38, a strip or strips of foil tape 67 may be provided to make a smooth transition from sheet chute 23 onto end portion 39. Likewise, a strip or strips of foil tape 68 may be provided between cover 56 and sheet chute 23. Once the sheet 24 is sensed by sheet detector 65 the motor 46 is activated and the belt 48 and cover 56 sandwich the sheet 24 therebetween and drive or pull sheet 24 past detecting means 22 which supplies data therefrom to the computer and the sheet 24 is thereafter ejected out the exit 59. If detector 25 senses only the black cover 56 over a sufficient time period, i.e. no white spaces between the black marks 31 in horizontal row 34 of the software in the computer will deactivate the supply of power to motor 46, thus eliminating any need for another detector downstream of the detecting means 22 to turn motor 46 off. A predetermined time period is set so that a user may manually feed one after another of the sheets 24 into the entrance 58 of the apparatus 20 of this invention without the motor 46 being turned off after each sheet passes through the apparatus 20, thereby enhancing the efficiency of operation and prolonging the life of the motor 46.

Figure 7:
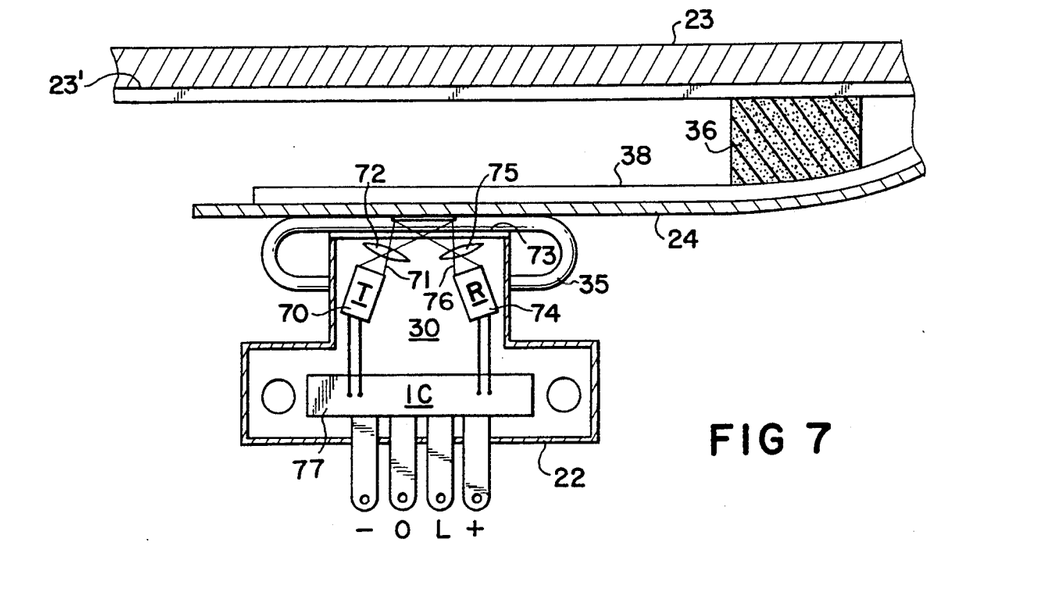
FIG. 7 is an enlarged view similar to FIG. 5 and showing the details of the optical apparatus.
Figure 8:
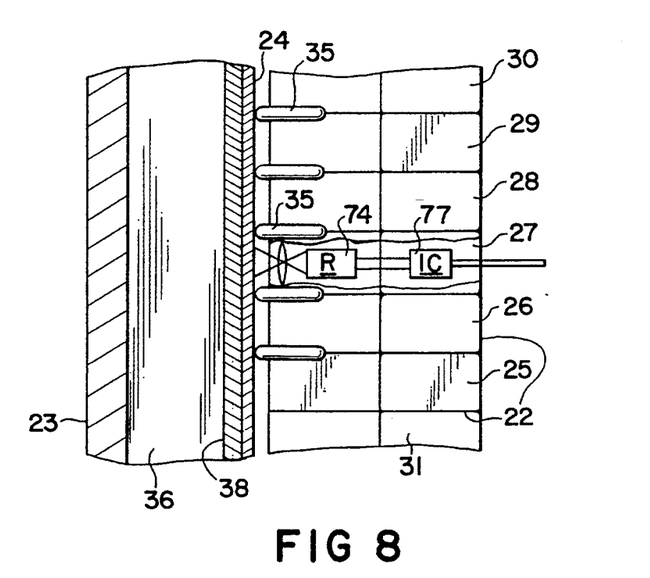
FIG. 8 is an enlarged side elevational view of FIG. 7.
Figure 9:
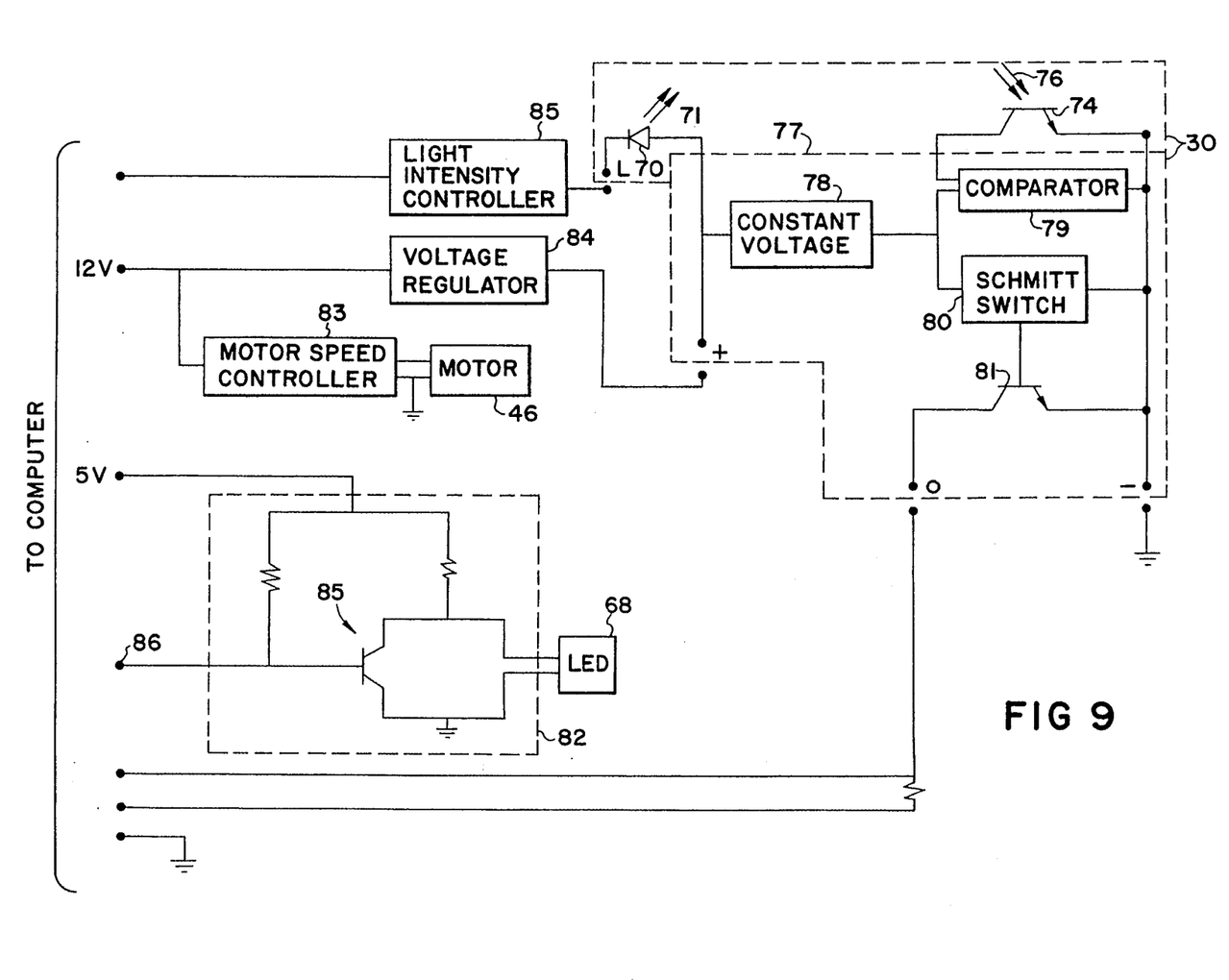
FIG. 9 is a simplified block diagram of the optical detecting apparatus of FIGS. 1-8.

In FIGS. 7 and 8 the detector 30 is seen to include a transmitter 70 for transmitting light 71 through a lens 72 through a red filter 73 properly focused on the scan sheet 24 to illuminate, for example, the marked data in column 3 (as seen in FIG. 1). The receiver 74 via lens 75 senses reflected light 76 from the marked data and passes a data signal through circuit 77 to the computer. Circuit 77 is seen in FIG. 9 to include a constant voltage circuit 78, comparator 79, a Schmitt switch 80 and an amplifier 81. While detector 30 is illustrated in FIG. 9, it is to be understood that each of detectors 25-29 and 65 are identical to detector 30 and are connected to the computer in a similar manner as that shown in FIG. 9. Of course, the circuit 82 for the LED 68 and the motor speed controller 83 for motor 46 would not be duplicated for the other detectors 25-29. The circuit of FIG. 9 also includes a voltage regulator 84 to regulate the voltage being applied to detector 30 and a light intensity controller 85 to regulate the amount of light 71 transmitted by transmitter 70.

Figure 10:
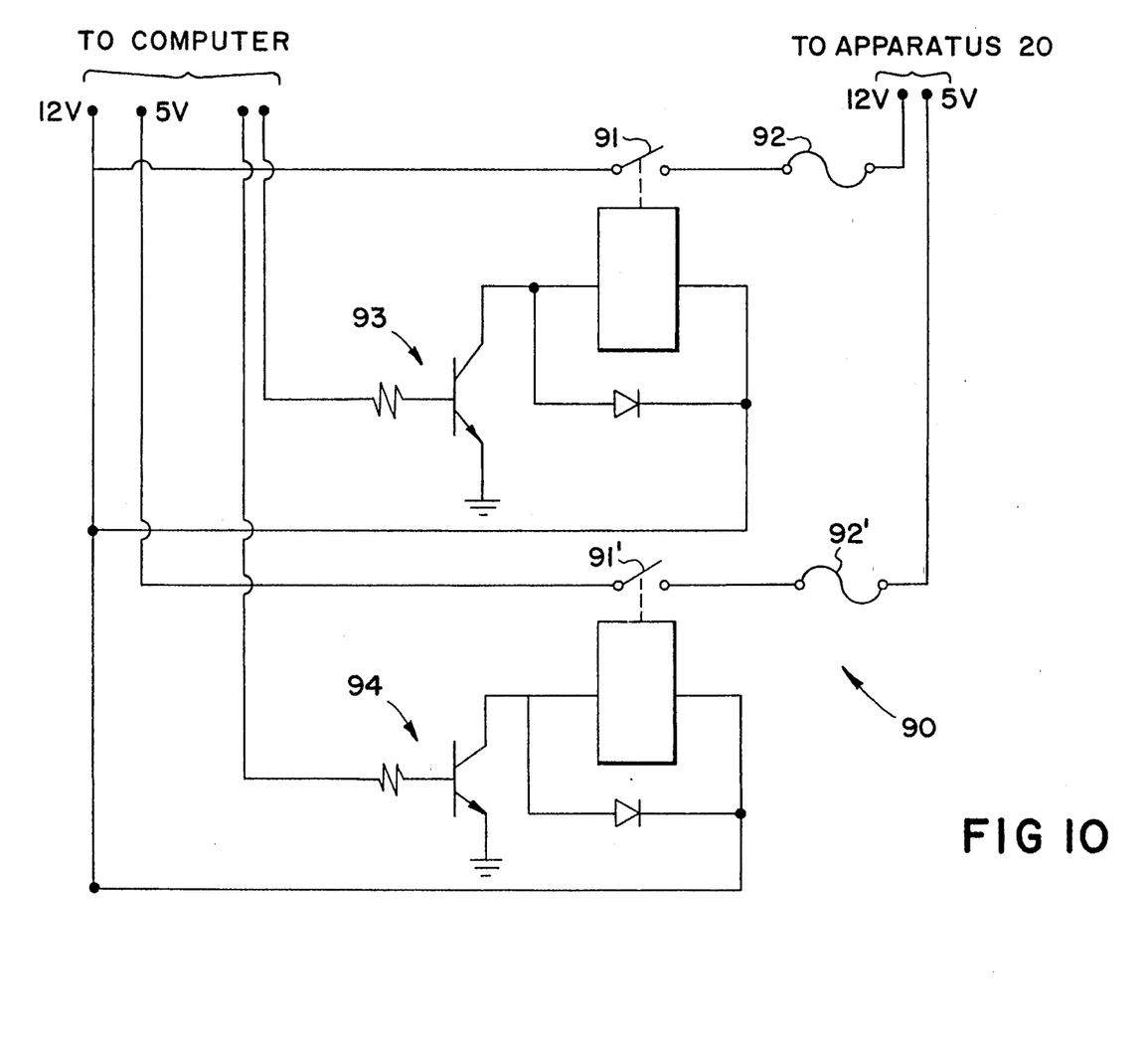
FIG. 10 is a circuit diagram of a protective power control circuit on the I/O card connecting the apparatus of FIGS. 1-9 and a computer to which the apparatus is electrically connected.

To protect the computer, the interface card includes the protective circuit 90 shown in FIG. 10. Since all of the detectors 25-30 and 65, the motor speed controller 83 and the LED circuit 82 (as seen in FIG. 9) have independent leads to the interface card in the computer, as well as do the 5 v, ground and 12 v power leads, parallel operations and control of all can be accomplished simultaneously by the computer. The circuit 90 includes a pair of amplifiers 93 and 94 powering reed relays 91 and 91' and a pair of self-repairing fuses 92 and 92' between the computer bus and the supply of power to the apparatus 20 in accord with this invention depicted in FIGS. 1-9.

While the invention has been described with respect to certain specific embodiments, it will be appreciated that many modifications and changes may be made by those skilled in the art without departing from the spirit of the invention. It is intended, therefore, by the appended claim to cover all such modifications and changes as fall within the true spirit and scope of the invention.

What is claimed as new and what it is desired to secure by Letters Patent of the United States is:

1. An apparatus for detecting data on a sheet having a row of index marks aligned with each other along a sheet and a plurality of spaced rows of answer spaces located perpendicularly to the row of index marks for data to be entered with each of the index marks, said apparatus comprising a housing having an inclined elongated sheet chute with a ledge extending therealong, a plurality of spaced optical detectors mounted to said housing and positioned with one of said detectors being an index detector in alignment with all of the row of index marks and the other said detectors being in alignment with respective rows of the answer spaces, electric circuit means including electric motor means mounted to said housing for driving the sheet from an entrance upstream of said detectors, past said detectors and out an exit downstream of said detectors, pressure means supported by said sheet chute at the location of said detectors for uniformly pressing the sheet toward said detectors, spacer means located between adjacent pairs of said detectors and mounted on said detectors facing said pressure means, said spacer means being removed from the optical paths of said detectors for maintaining the sheet a predetermined distance away from said detectors as determined by the focal length of the optical path of said detectors.

2. The apparatus of claim 1 wherein said electric motor means includes a motor, a driving shaft connected to said motor, a driven shaft spaced from said driving shaft, an endless elongated belt connected about said shafts, said belt having a sheet engaging span extending generally in alignment with said spacer means, and another pressure means supported by said sheet chute spacedly from said detectors for pressing the sheet against said sheet engaging span of said belt to enable said belt to frictionally engage the sheet and move same between said entrance and out said exit.

3. The apparatus of claim 1 wherein said electric motor means includes a motor, a driving shaft connected to said motor, a driven shaft spaced from said driving shaft, an endless elongated belt connected about said shafts, said belt having a sheet engaging span extending generally in alignment with said spacer means, said belt engaging said driven shaft adjacent said entrance and said driving shaft adjacent said exit, said belt engagement with said driving shaft at said exit being closer to said chute ledge than said belt engagement with said driven shaft, and means for maintaining said belt in its position on said driving shaft to assure engagement of the edge of the sheet with said ledge as the sheet is transported through said detector location from said entrance to said exit.

4. The apparatus of claim 1 further comprising means for automatically disabling said electric motor means between successive sheet feeds.

5. The apparatus of claim 4 wherein said means for automatically disabling includes a background simulating solid index marks for detection by said index detector after a predetermined time interval in which only said solid index marks are detected.

6. The apparatus of claim 1 further comprising another detector located at said entrance to detect initial insertion of the sheet by detecting an edge of the sheet which activates said electric circuit means to enable said electric motor means.

7. The apparatus of claim 1 further comprising another detector located at said entrance to detect initial insertion of the sheet by detecting an edge of the sheet, said electric circuit means including means to enable said electric circuit means when said another detector detects the initial insertion of the edge of the sheet.

8. The apparatus of claim 1 further comprising an indicator mounted to said housing, said indicator means when enabled being indicative of a ready state of said apparatus to be fed a sheet.

9. The apparatus of claim 1 wherein the sheet is reuseable plastic.

10. The apparatus of claim 1 wherein the sheet is paper.

11. The apparatus of claim 2 wherein said electric circuit means includes interface means for electrically connecting said apparatus to a computer for driving said electric motor means.

12. The apparatus of claim 11 wherein all of said detectors are connected via said interface means in parallel so that all of said detectors may pass signals to a computer simultaneously.

13. The apparatus of claim 11 wherein said interface means includes means for disabling power from a computer in the event of an overload in said electrical circuit means of said apparatus and other electrical faults between said apparatus and a computer.

14. The apparatus of claim 11 further comprising an initial sheet sensing detector located at said entrance for sensing the presence of a sheet and for providing a signal through said interface means to cause a computer to enable said electric motor means to drive the sheet through said apparatus.

15. The apparatus of claim 14 further comprising a background member simulating solid index marks disposed opposite to said initial sheet sensing detector with a sheet being insertable therebetween which is sensed by said initial sheet sensing detector.

16. An apparatus for detecting data on a sheet having a horizontal row if index marks aligned with each other along a sheet and a plurality of spaced rows of answer spaces in columns for data to be entered in columnar alignment with each of the index marks, said apparatus comprising a housing having an inclined horizontally elongated sheet chute with a lower ledge extending therealong, a plurality of vertically spaced optical detectors mounted to said housing and positioned with one of said detectors being an index detector in alignment with all of said horizontal row of index marks and the other said detectors being in alignment with respective said horizontal rows of the answer spaces, electric circuit means including electric motor means mounted to said housing for driving the sheet from an entrance upstream of said detectors, past said detectors and out an exit downstream of said detectors, said electric motor means including a motor, a driving shaft connected to said motor, a driven shaft spaced horizontally from said driving shaft, an endless elongated belt connected about said shafts, said belt having a sheet engaging span extending generally horizontally, pressure means supported by said sheet chute spacedly below said detectors for pressing the sheet against said sheet engaging span of said belt to enable said belt to frictional engage the sheet and move same between said entrance and out said exit.

17. The apparatus of claim 16 wherein said means supported by said sheet chute at the location of said detectors, includes another pressure means for uniformly pressing the sheet toward said detectors, and spacer means mounted on said detectors facing said another pressure means for maintaining the sheet a predetermined distance away from said detectors.

18. The apparatus of claim 16 wherein said belt engagement with said driving shaft at said exit being horizontally below said belt engagement with said driven shaft to cause said belt to be driven at an angle with respect to the horizontal to assure engagement of the lower edge of the sheet with said ledge as the sheet is transported through said detector location from said entrance to said exit.

19. The apparatus of claim 16 further comprising means for automatically disabling said electric motor means between successive sheet feeds.

20. The apparatus of claim 16 further comprising another detector located at said entrance to detect initial insertion of the sheet by detecting an edge of the sheet which activates said electric circuit means to enable said electric motor means.

* * * * *